US010807028B2

(12) United States Patent
Cogliati

(10) Patent No.: US 10,807,028 B2
(45) Date of Patent: Oct. 20, 2020

(54) AIR AND PARTICLE SEPARATORS

(71) Applicant: AMTROL Licensing Inc., West Warwick, RI (US)

(72) Inventor: Michael Cogliati, Warwick, RI (US)

(73) Assignee: AMTROL LICENSING INC., West Warwick, RI (US)

( * ) Notice: Subject to any disclaimer, the term of this patent is extended or adjusted under 35 U.S.C. 154(b) by 17 days.

(21) Appl. No.: 16/307,730

(22) PCT Filed: Jun. 9, 2017

(86) PCT No.: PCT/US2017/036903
§ 371 (c)(1),
(2) Date: Dec. 6, 2018

(87) PCT Pub. No.: WO2017/214598
PCT Pub. Date: Dec. 14, 2017

(65) Prior Publication Data
US 2019/0176068 A1    Jun. 13, 2019

Related U.S. Application Data

(60) Provisional application No. 62/348,004, filed on Jun. 9, 2016.

(51) Int. Cl.
*B01D 36/00* (2006.01)
*B01D 46/42* (2006.01)
(Continued)

(52) U.S. Cl.
CPC ....... *B01D 36/001* (2013.01); *B01D 19/0031* (2013.01); *B01D 29/15* (2013.01);
(Continued)

(58) Field of Classification Search
CPC ...... B01D 36/001; B01D 46/42; B01D 29/58; B01D 29/15; B01D 19/0031;
(Continued)

(56) References Cited

U.S. PATENT DOCUMENTS 2,358,612 A * 9/1944 Acker .................... B03C 1/284
                                                         210/222
2,401,079 A * 5/1946 Jones ................. B01D 19/0057
                                                          96/157
(Continued)

FOREIGN PATENT DOCUMENTS

EP         1629875 A1    3/2006
GB         2491246 A    11/2012
WO      2010149787 A1   12/2010

OTHER PUBLICATIONS

PCT International Search Report from the International Application No. PCT/US2017/036903, dated Sep. 18, 2017, 3 pages.
(Continued)

*Primary Examiner* — Claire A Norris
*Assistant Examiner* — Ekandra S. Miller-Cruz
(74) *Attorney, Agent, or Firm* — Tucker Ellis LLP; Carlos Garritano

(57) ABSTRACT

Disclosed is an apparatus for removing air and particles, such as dirt, from a fluid which includes, inter alia, an elongated pressure vessel that has a vessel wall that defines an interior chamber and a vertical axis for the apparatus. Inlet and outlet ports are formed in the vessel wall, the inlet port allowing fluid to enter the interior chamber and the outlet port allowing conditioned fluid to exit the interior chamber of the pressure vessel. A plurality of concentrically arranged cylindrical mesh screen elements are positioned within the interior chamber that release entrained air from the fluid entering the interior chamber. Additionally, a cylindrical tube is positioned within the concentrically arranged mesh screen elements for removing particles from the fluid entering the interior chamber. In certain embodiments the apparatus includes a magnetic particle collector.

25 Claims, 8 Drawing Sheets

(51) Int. Cl.
*B01D 29/15* (2006.01)
*B01D 19/00* (2006.01)
*B01D 29/58* (2006.01)
*B01D 29/33* (2006.01)
*B01D 35/02* (2006.01)
*B01D 35/06* (2006.01)
*B03C 1/28* (2006.01)
*B03C 1/033* (2006.01)

(52) U.S. Cl.
CPC ............. *B01D 29/58* (2013.01); *B01D 46/42* (2013.01); *B03C 1/0332* (2013.01); *B03C 1/284* (2013.01); *B03C 1/286* (2013.01); *B03C 1/288* (2013.01); *B03C 2201/18* (2013.01); *B03C 2201/20* (2013.01); *B03C 2201/28* (2013.01)

(58) Field of Classification Search
CPC ...... B01D 29/336; B01D 35/02; B01D 35/06; B03C 1/288; B03C 1/0332; B03C 1/284; B03C 1/286; B03C 2201/28; B03C 2201/20; B03C 2201/18
USPC ......................................................... 210/223
See application file for complete search history.

(56) References Cited

U.S. PATENT DOCUMENTS

| | | | | |
|---|---|---|---|---|
| 2,804,938 | A | | 9/1957 | Oppenheimer et al. |
| 3,285,420 | A | * | 11/1966 | Muller ................. B01D 29/58 210/262 |
| 3,529,719 | A | * | 9/1970 | Gravbill ............. B01D 21/0075 210/714 |
| 3,722,693 | A | * | 3/1973 | Stull ...................... B01D 21/02 210/320 |
| 3,807,144 | A | * | 4/1974 | Graybill ................. B01D 45/00 96/292 |
| 4,248,714 | A | * | 2/1981 | Acosta ................... B01D 29/15 210/238 |
| 4,495,068 | A | * | 1/1985 | Rosaen .................. B01D 35/06 210/91 |
| 5,228,990 | A | * | 7/1993 | Chiang .................. B01D 35/06 210/223 |
| 5,453,116 | A | * | 9/1995 | Fischer .............. B01D 46/4263 95/278 |
| 6,077,333 | A | * | 6/2000 | Wolfs ..................... B03C 1/288 96/1 |
| 6,180,005 | B1 | | 1/2001 | Iannicelli |
| 2003/0221560 | A1 | | 12/2003 | MacDuff |
| 2005/0155925 | A1 | * | 7/2005 | Schipper ........... B01D 19/0005 210/497.1 |
| 2012/0151887 | A1 | | 6/2012 | Dorao et al. |
| 2013/0048115 | A1 | * | 2/2013 | Wise .................. F01M 11/0408 137/561 R |
| 2015/0101964 | A1 | | 4/2015 | Maynard |

OTHER PUBLICATIONS

PCT Written Opinion of the International Searching Authority from the International Application No. PCT/US2017/036903, dated Sep. 18, 2017, 11 pages.

* cited by examiner

AIR AND PARTICLE SEPARATORS

CROSS-REFERENCE TO RELATED APPLICATIONS

This application is a national phase application of International Application No. PCT/US2017/036903 filed Jun. 9, 2017, which claims priority to U.S. Provisional Application Ser. No. 62/348,004, filed on Jun. 9, 2016 and entitled Air and Dirt Separators. The entireties of which are incorporated herein by reference.

BACKGROUND OF THE INVENTION

1. Field of the Invention

The subject disclosure relates to air and particle separators, and more particularly to, devices and systems that are adapted and configured to remove entrained air and particles, such as dirt, from a fluid system, and still further to air and particle separators which utilize a plurality of mesh screens and a solid cylindrical tube concentrically position within a pressure vessel to facilitate removal of air and particles from within the fluid system.

2. Background of the Related Art

In general, residential and industrial buildings utilize a cooling or heating system for controlling the indoor temperature which includes a closed loop fluid circulation system. In such environmental systems, a fluid such as water flows in pipes and is either cooled or heated, and forcedly circulates through the pipes by means of circulating pumps so as to exchange thermal energy with the surrounding environment.

However, air is often dissolved or entrained in the fluid and/or present in the fluid in the form of gas bubbles. Moreover, dirt particles and/or wear debris is often suspended in the circulating fluid.

Separators are typically used in environmental heating and cooling systems which are designed to remove entrained air and particles from the circulating fluid. It is important to remove the air from the circulating fluid because the air can cause noise, corrosion, cavitation, etc., which are all harmful to the system. Additionally, removal of dirt, particles and debris help keep the system components from becoming fouled and worn over time. However, prior art separators have shortcomings, such as: poor removal efficiency at high liquid flow rates and large system pressure drop due to flow restrictions cause by the separator.

Therefore, there is a need for a separator which efficiently removes air and dirt from the fluid without causing a large pressure drop in the system and creating the need for higher pumping pressure.

SUMMARY OF THE INVENTION

As will be discussed in greater detail below in the Detailed Description section of this disclosure, the present disclosure is directed to an apparatus for removing air and particles, such as dirt, from a fluid which includes, inter alia, an elongated pressure vessel that has a vessel wall that defines an interior chamber and a vertical axis for the apparatus. Inlet and outlet ports are formed in the vessel wall, the inlet port allowing fluid to enter the interior chamber and the outlet port allowing conditioned fluid to exit the interior chamber of the pressure vessel. A plurality of concentrically arranged cylindrical mesh screen elements are positioned within the interior chamber that release entrained air from the fluid entering the interior chamber. Additionally, a cylindrical tube is positioned within the concentrically arranged mesh screen elements for removing particles from the fluid entering the interior chamber.

It is envisioned that the vessel can further include top and bottom ports, an air vent associated with the top port of the pressure vessel that allows air to be vented from the pressure vessel and a debris trap associated with the bottom port of the pressure vessel for allowing collected particles to be purged from the pressure vessel.

Preferably, each of the plurality of concentrically arranged mesh screen elements is made from separate piece of screen material which is welded along a seam to form a cylinder. In certain constructions, the plurality of concentrically arranged mesh screen elements includes five cylindrical screen elements having differing diameters. However, those skilled in the art will readily appreciate the various number of mesh screen elements can be used without departing from the inventive aspects of the present disclosure. Preferably, the screen material used for the plurality of mesh screen elements is non-woven and made from vertical wire welded over horizontal wire with specific gaps to allow air bubbles to attach to the vertical wire and travel vertically unimpeded.

In certain preferred constructions, the inlet and outlet ports each have an inner diameter that is smaller than or equal to an outer diameter of the cylindrical tube.

The apparatus of the present disclosure can also include spacer arms that maintain a radial spacing between each of the concentrically arranged mesh screens.

In certain embodiments, the inlet and outlet ports are aligned along an axis which intersects with the vertical axis for the pressure vessel. Alternatively, the inlet and outlet ports can be vertically offset from one another or not located in the same horizontal plane.

Preferably, the apparatus further includes inlet piping that extends from and is operatively connected to the inlet port, wherein the inlet piping is arranged at an angle less than 90 degrees from the vertical axis of the pressure vessel such that fluid is directed into the interior chamber of the pressure vessel at a downward angle.

Additionally, the apparatus can further include outlet piping which extends from and is operatively connected to the outlet port, wherein the outlet piping is arrange at an angle which is less than 90 degrees from the vertical axis of the pressure vessel.

It is envisioned that in certain constructions, the apparatus can further include a magnetic particle collector extending into the interior chamber of the pressure vessel. The magnetic particle collector can include an elongated tubular well that defines an elongated cavity and a series of magnets removably inserted into the elongated cavity of the well.

The present disclosure is further directed to a separator device that includes, inter alia, a pressure vessel that has inlet and outlet ports and has a vessel wall which defines an interior chamber. The inlet port allows fluid to enter the interior chamber and the outlet port allows conditioned fluid to exit the interior chamber. At least one cylindrical mesh screen is positioned within the interior chamber for releasing entrained air from the fluid entering the interior chamber and a solid cylindrical tube is positioned within the at least one cylindrical mesh screen for removing particles from the fluid entering the interior chamber.

It is envisioned that the vessel can further include top and bottom ports, an air vent associated with the top port of the pressure vessel that allows air to be vented from the pressure vessel and a debris trap associated with the bottom port of the pressure vessel for allowing collected particles to be purged from the pressure vessel.

Preferably, each mesh screen element is made from separate piece of screen material which is welded along a seam to form a cylinder. In certain constructions, there are five cylindrical screen elements having differing diameters. However, those skilled in the art will readily appreciate the various number of mesh screen elements can be used without departing from the inventive aspects of the present disclosure. Preferably, the screen material used for the plurality of mesh screen elements is non-woven and made from vertical wire welded over horizontal wire with specific gaps to allow air bubbles to attach to the vertical wire and travel vertically unimpeded.

In certain preferred constructions, the inlet and outlet ports each have an inner diameter that is smaller than or equal to an outer diameter of the cylindrical tube.

The apparatus of the present disclosure can also include spacer arms that maintain a radial spacing between each of the concentrically arranged mesh screens.

In certain embodiments, the inlet and outlet ports are aligned along an axis which intersects with the vertical axis for the pressure vessel. Alternatively, the inlet and outlet ports can be vertically offset from one another or not located in the same horizontal plane.

Preferably, the apparatus further includes inlet piping that extends from and is operatively connected to the inlet port, wherein the inlet piping is arranged at an angle less than 90 degrees from the vertical axis of the pressure vessel such that fluid is directed into the interior chamber of the pressure vessel at a downward angle.

Additionally, the apparatus can further include outlet piping which extends from and is operatively connected to the outlet port, wherein the outlet piping is arrange at an angle which is less than 90 degrees from the vertical axis of the pressure vessel.

It is envisioned that in certain constructions, the apparatus can further include a magnetic particle collector extending into the interior chamber of the pressure vessel. The magnetic particle collector can include an elongated tubular well that defines an elongated cavity and a series of magnets removably inserted into the elongated cavity of the well.

The present disclosure is directed to a separator device that includes, among other elements, a pressure vessel having inlet and outlet ports and a vessel wall which defines an interior chamber. The inlet port allows fluid to enter the interior chamber and the outlet port allows conditioned fluid to exit the interior chamber. Aat least one cylindrical mesh screen is positioned within the interior chamber for releasing entrained air from the fluid entering the interior chamber; and a magnetic particle collector extends into the interior chamber of the pressure vessel.

Preferably, the device further includes a solid cylindrical tube positioned within the at least one cylindrical mesh screen for removing particles from the fluid entering the interior chamber.

BRIEF DESCRIPTION OF THE DRAWINGS

So that those having ordinary skill in the art to which the present disclosure pertains will more readily understand how to employ the systems and methods of the present disclosure, embodiments thereof will be described in detail below with reference to the drawings, wherein.

These and other aspects of the subject disclosure will become more readily apparent to those having ordinary skill in the art from the following detailed description of the invention taken in conjunction with the drawings.

DETAILED DESCRIPTION OF PREFERRED EMBODIMENTS

Disclosed herein are detailed descriptions of specific embodiments of the air and particle separators of the present invention. It will be understood that the disclosed embodiments are merely examples of the way in which certain aspects of the invention can be implemented and do not represent an exhaustive list of all of the ways the invention may be embodied. Indeed, it will be understood that the systems, devices and methods described herein may be embodied in various and alternative forms. Moreover, the figures are not necessarily to scale and some features may be exaggerated or minimized to show details of particular components.

Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention.

Figure 1:
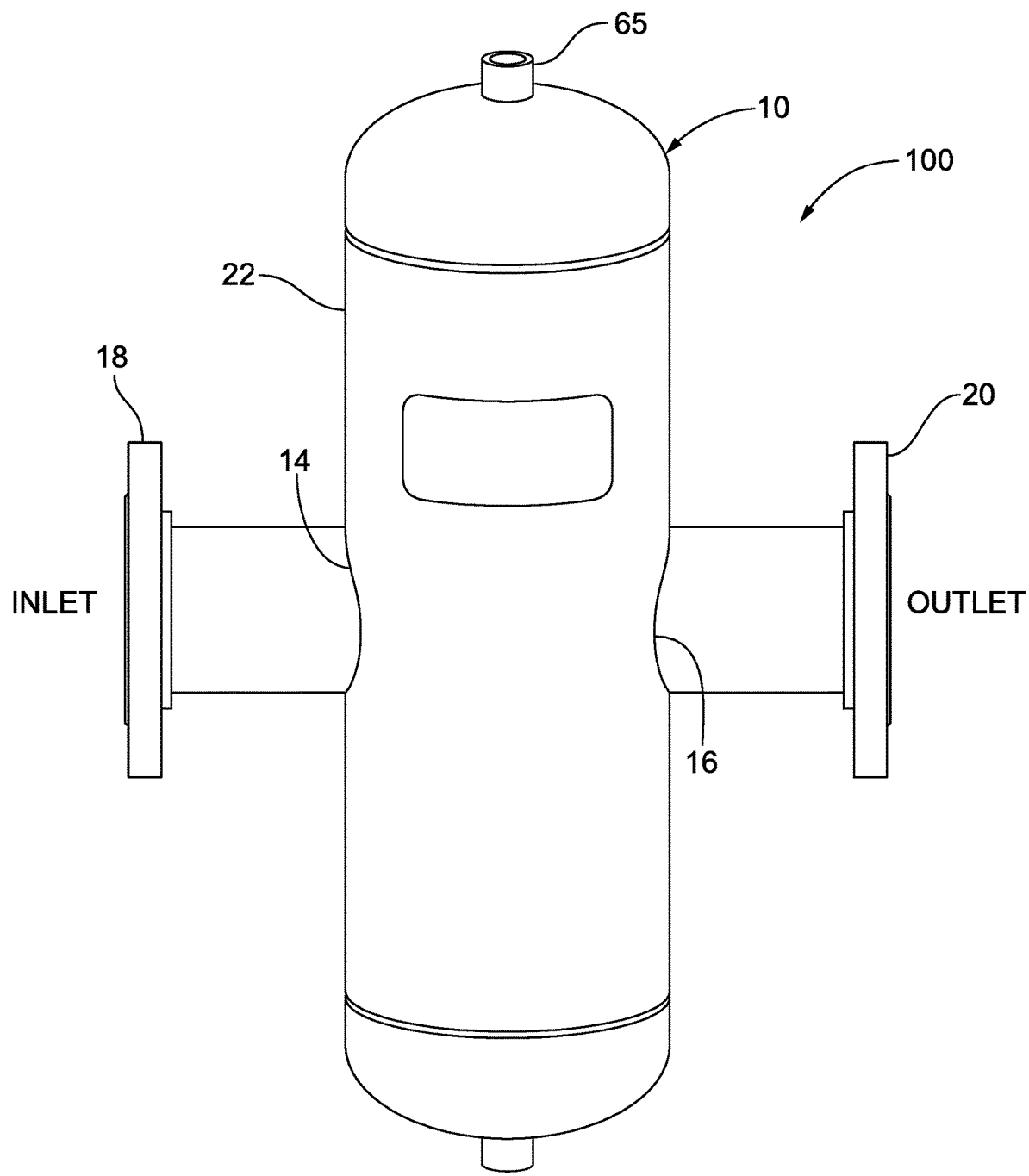
FIG. 1 provides a perspective view of an air and particle separator which has been constructed in accordance with an embodiment of the present disclosure.
Figure 2A:
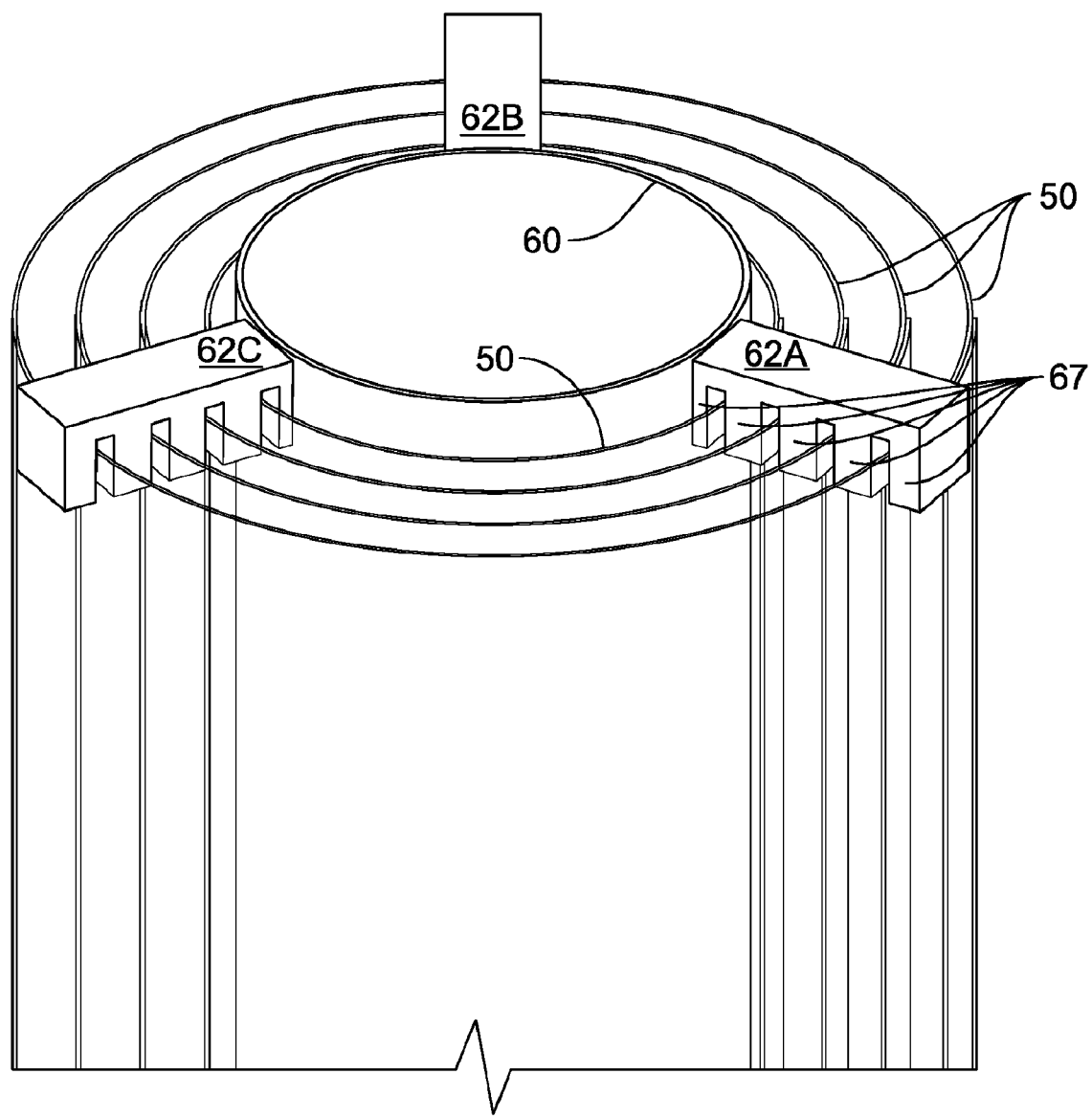
FIG. 2A provides a perspective view taken from above of the internal components of the air and particle separator of FIG. 1.
Figure 2B:
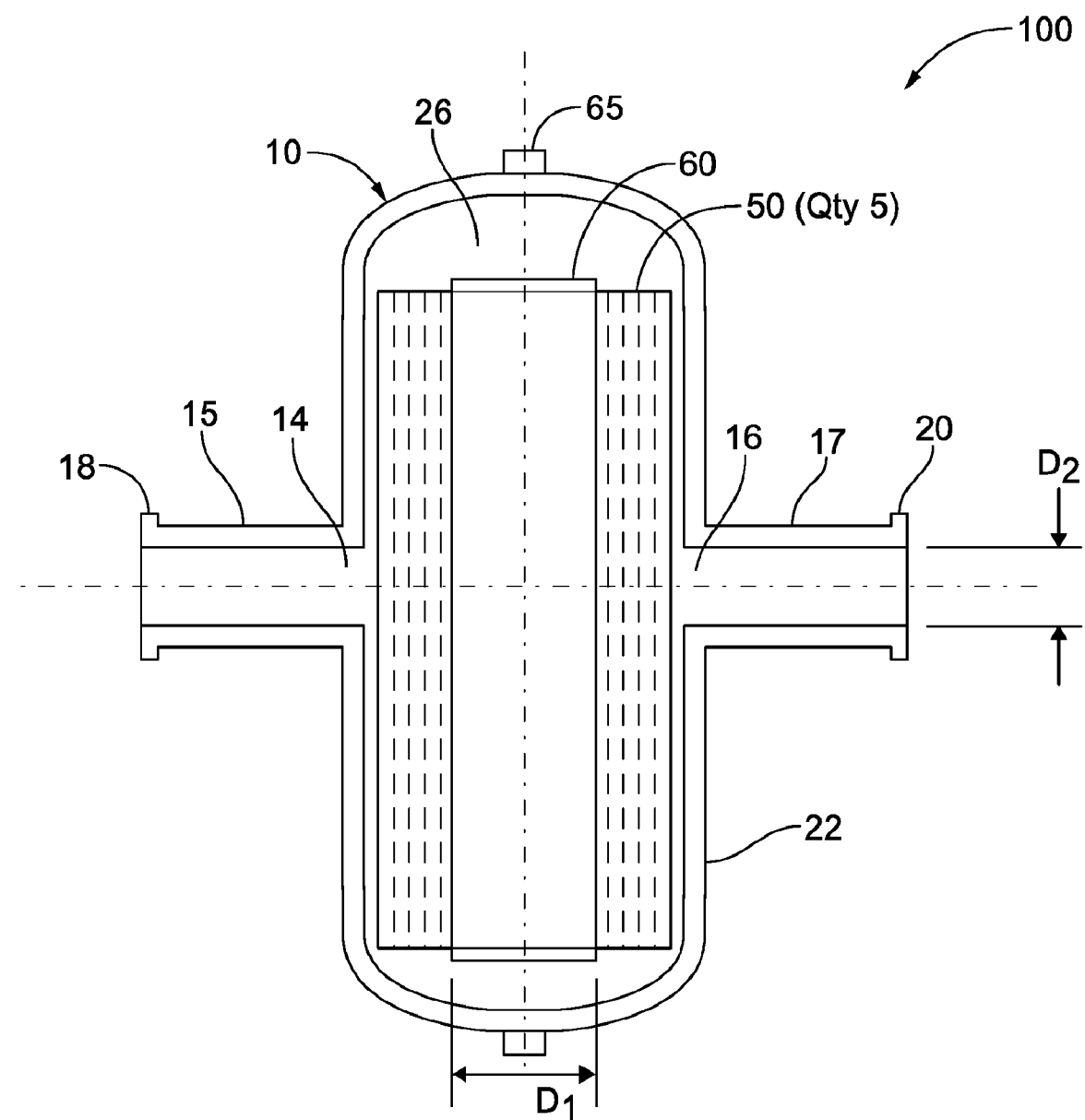
FIG. 2B provides a cross-sectional view of an air and particle separator which has been constructed in accordance with an embodiment of the present disclosure.

Referring now to FIGS. 1, 2A and 2B, there is illustrated a separator apparatus for removing air and particle, such as dirt or wear debris, from a fluid which has been constructed in accordance with an embodiment of the present invention and designated as reference number 100. Separator 100 includes, inter alia, a pressure vessel 10 that has an inlet port 14 and an outlet port 16 and a vessel wall 22. Inlet and outlet ports 14/16 each include flanged ends 18/20 respectively which allow separator 100 to be connected in-line with a fluid circulation system. Inlet piping 15 extends between inlet port 14 and flanged end 18 and outlet piping 17 extends between outlet port 16 and flanged end 20. As shown in FIG. 2B, inlet port 14 and the outlet port 16 are concentrically arranged and the inlet piping 15 and outlet piping 17 extend in the same horizontal plane.

The wall 22 of pressure vessel 10 defines an interior chamber 26. The inlet port 14 allows fluid to enter the interior chamber 26 and the outlet port 16 allows conditioned fluid to exit the interior chamber 26. As shown in FIGS. 2A and 2B, the separator 100 also includes a plurality of concentrically arranged mesh screens 50 and a cylindrical tube 60. The mesh screens 50 are positioned within the interior chamber 26 for releasing entrained air from the fluid entering the interior chamber 26. Cylindrical tube 60 is positioned within the concentrically arranged mesh screens 50 for removing the dirt from the fluid entering the interior chamber 26.

Separator 100 also includes an air vent 65 associated with the pressure vessel 10 which allows air to escape the interior chamber 26. Moreover, the pressure vessel 10 can include a debris trap (not shown) for collecting dirt and/or debris removed from the fluid entering the interior chamber 26.

Each of the plurality of concentrically arranged mesh screens 50 is made from separate piece of screen material which is welded along a seam to form a cylinder. Those skilled in the art will readily appreciate that various known techniques can be used for creating and forming the cylindrical mesh screens.

In FIG. 2A four mesh screens 50 are used in separator 100 and in FIG. 2B five screens 50 are used. However, those skilled in the art will readily appreciate that any number of screens can be used without departing from the inventive aspects of the present disclosure. Moreover, the size of the openings in the mesh screen material can be chosen based on intended use, installation and/or application. Additionally, each screen could have a different mesh size. For example, the mesh size for the screens 50 used in separator 100 could increase as the fluid travels radially inward.

In the embodiment shown in FIGS. 2A and 2B, the inlet and outlet ports 14/16 have an inner diameter $D_2$ and the cylindrical tube 60 has an outer diameter $D_1$. In preferred constructions, the diameter $D1$ of the tube 60 is greater than or equal to the inner diameter $D_2$ of the inlet and outlet ports 14/16. With such an arrangement, the fluid entering the interior chamber 26 or the pressure vessel 10 through inlet port 14 is directed into the wall of tube 60, before exiting through outlet port 16, which facilitates debris removal and collection. If the inner diameter of the inlet port 14 was larger than the outer diameter of tube 60, some of the entering fluid could pass through the interior chamber 26 without colliding with tube 60 before reaching outlet port 16.

As shown in FIG. 2A, the separator further includes radially extending spacer arms 62 which have radially-spaced apart fingers 67 that extend downward between adjacent screens 50 and maintain a radial spacing between each of the concentrically arranged mesh screens 50. The spacer arms 62 can be included on both the top and the bottom of the arrangement of screens 50. The spacer arms 62 can also be secured to tube 60 either permanently (e.g. welded) or releasably (e.g. bolted) so as to prevent movement during installation and operation of the separator 100.

As discussed previously and as shown in FIGS. 2B and 3, inlet port 14 and outlet port 16 are axially aligned (i.e. the central axis for the inlet and outlet are concentric). However, those skilled in the art will readily appreciate that the flow axis for the inlet and outlet ports can be vertically (see FIG. 4) and/or horizontally offset.

Figure 3:
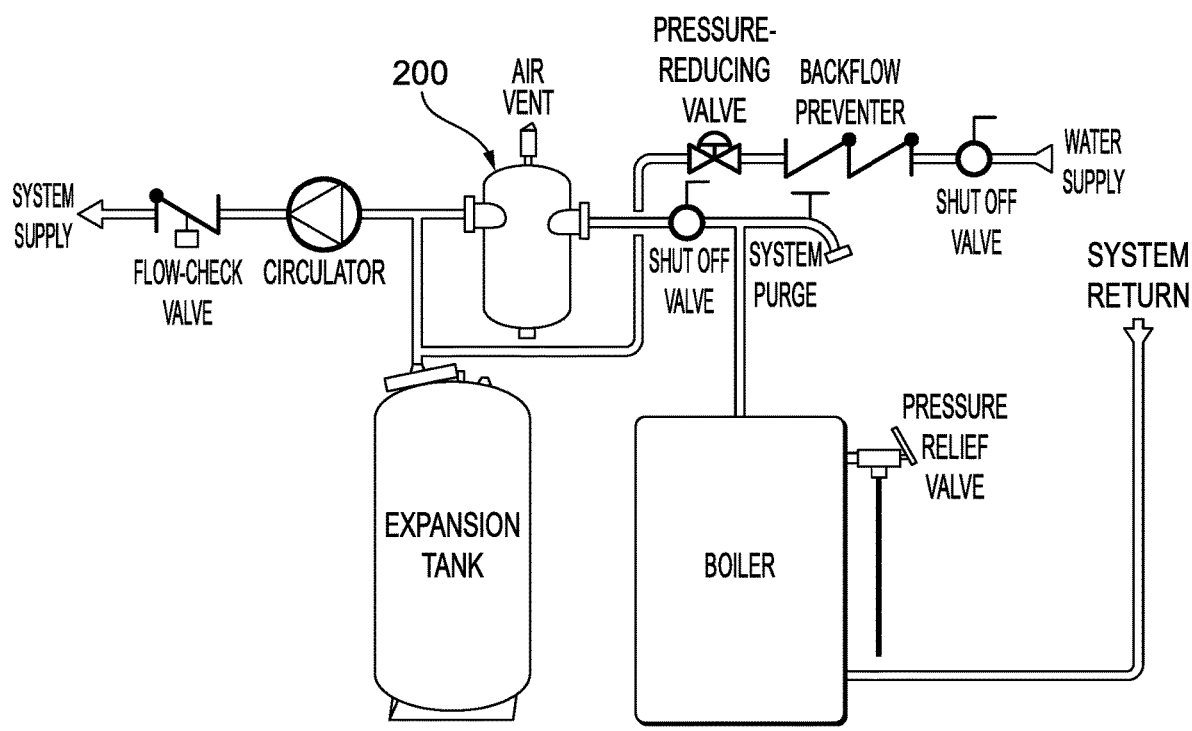
FIG. 3 provides a graphical illustration of a heating system which employs an air and particle separator which has been constructed in accordance with the present disclosure.
Figure 4:
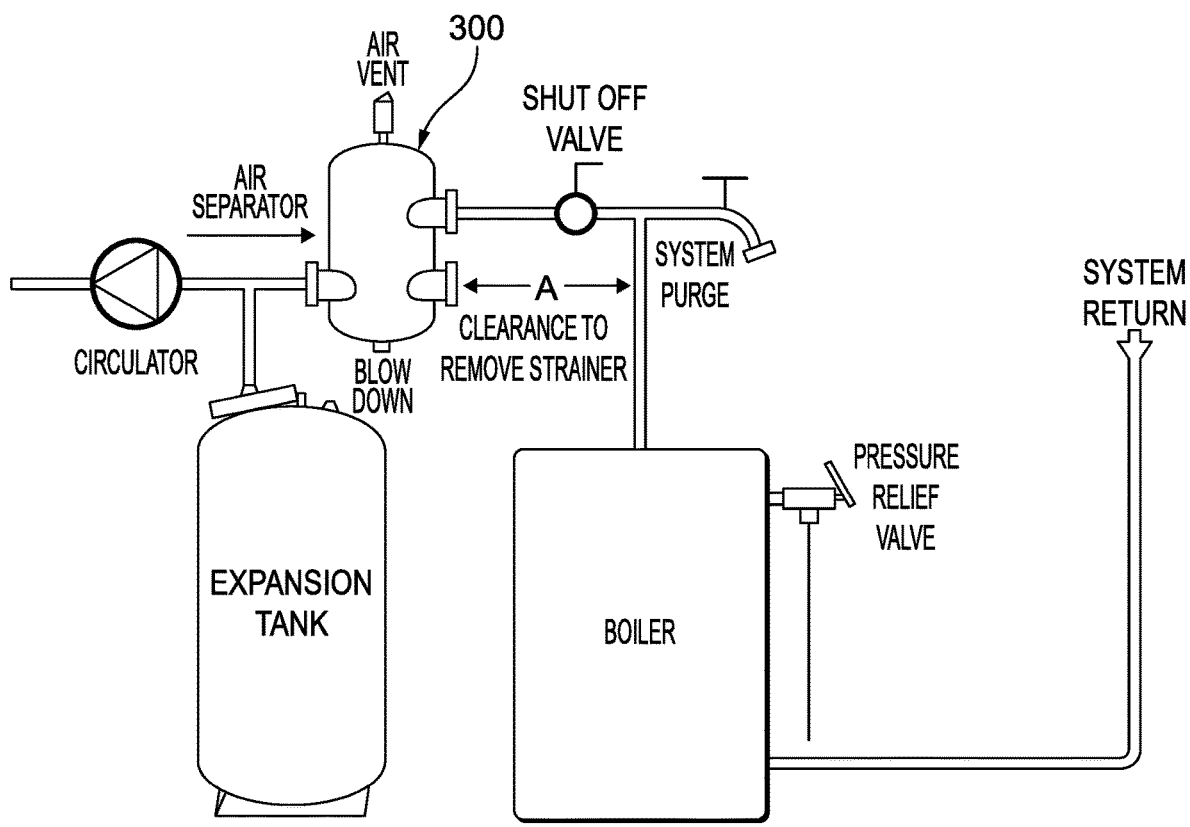
FIG. 4 provides a graphical illustration of a heating system which employs an air and particle separator which has been constructed in accordance with a further embodiment of the present disclosure and the separator includes a strainer basket and has vertically offset inlet and outlet ports.

FIGS. 3 and 4 are provided to illustrate the use of an air and particle separator which has been constructed in accordance with an embodiment of the present invention installed in a representative environmental system. In FIG. 3 the separator has been identified using reference numeral 200 and in FIG. 4, reference numeral 300 has been used to identify the separator.

As shown in the figures, the separators of the present disclosure are pressure vessels plumbed straight in-line within a plumbing system to remove air and particles from the system fluid. As the fluid flows through the system piping, it enters the separator 100/200/300. Fluid received into the interior chamber 26 flows through concentric mesh screens 50. As it does so, entrained air in the fluid is released and rises to the top of the vessel where an air vent 65 removes the air from the system.

The concentric mesh screens create successive impacts of the fluid to insure efficient removal of air. As discussed previously, in the center of the concentric mesh screens 50 is a cylindrical tube 60 with solid wall. This tube 60 creates a barrier for the fluid whereas as fluid flows into the tube wall, any solid traveling with the water is removed from flow-through and falls to the bottom of the vessel 10 where it collects for removal at a later time of maintenance. Removal of dirt helps keep the system components from becoming fouled and worn over time. The combination of the concentric mesh screens and center tube create an effective means for removal of air and particles as well as allow flow of fluid without inducing a significant pressure drop. This separator design takes advantage of controlled flow to perform with reduced pressure drop. A significant pressure drop seen in competitive devices results in the need for higher pump output to accommodate the flow restriction imposed and causes either more energy for use or more where on the pump parts.

As discussed above, the concentric screens are made from separate continuous screen, welded at the seam versus woven mesh. An advantage of this design is that air bubbles in the fluid carry up the screen vertical rails/strands and release at top. Woven designs have inherent interruptions with horizontal weaves so air elimination is not efficient.

Preferably, as noted previously, the internal tube has a specific diameter that is greater than or equal to the diameter of the inlet/outlet. This is to force the fluid to flow around the internal tube so contact is certain for dirt separation.

Figure 5A:
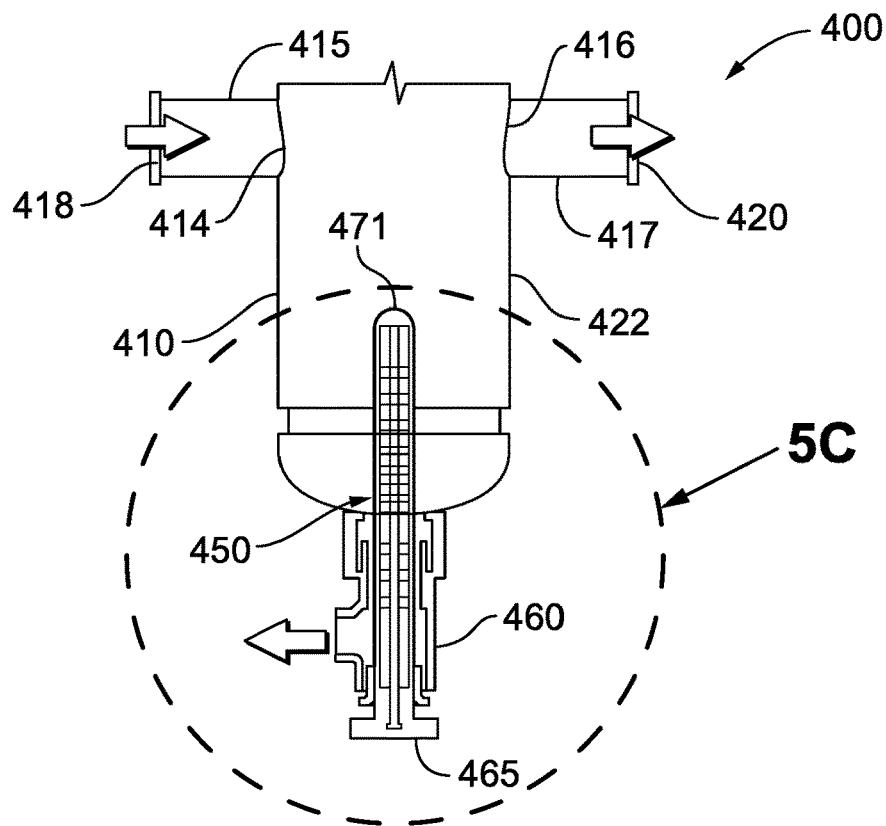
FIG. 5A provides a perspective view of an air and particle separator which has been constructed in accordance with yet a further embodiment of the present disclosure, the separator including a magnetic particle collector which extends into the bottom of the vessel.
Figure 5B:
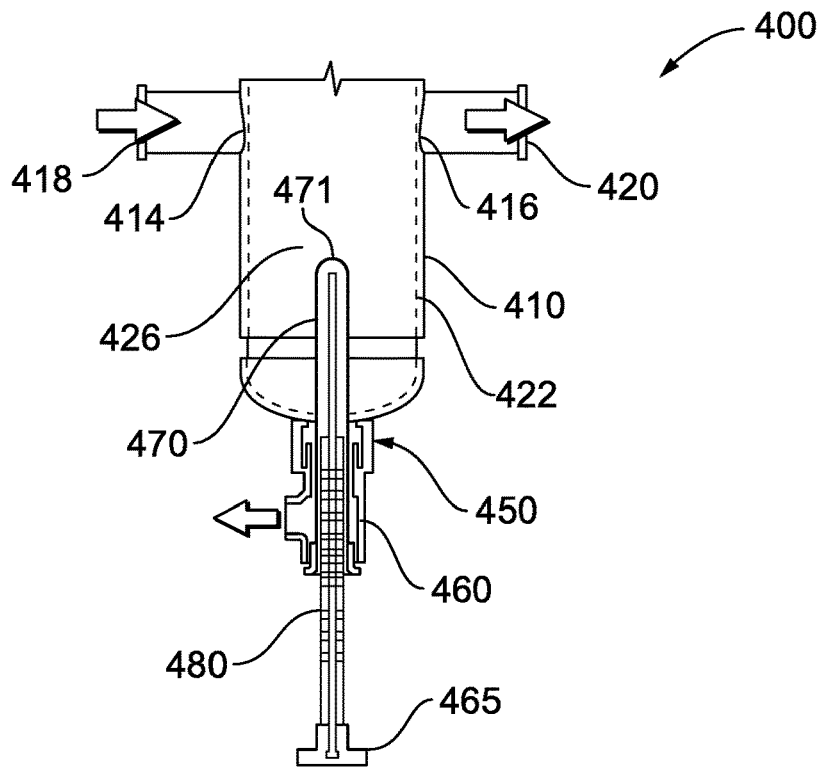
FIG. 5B provides a perspective view of the separator for FIG. 5A showing the end cap, stem and magnets being removed from within the well of the magnetic particle collector.
Figure 5C:
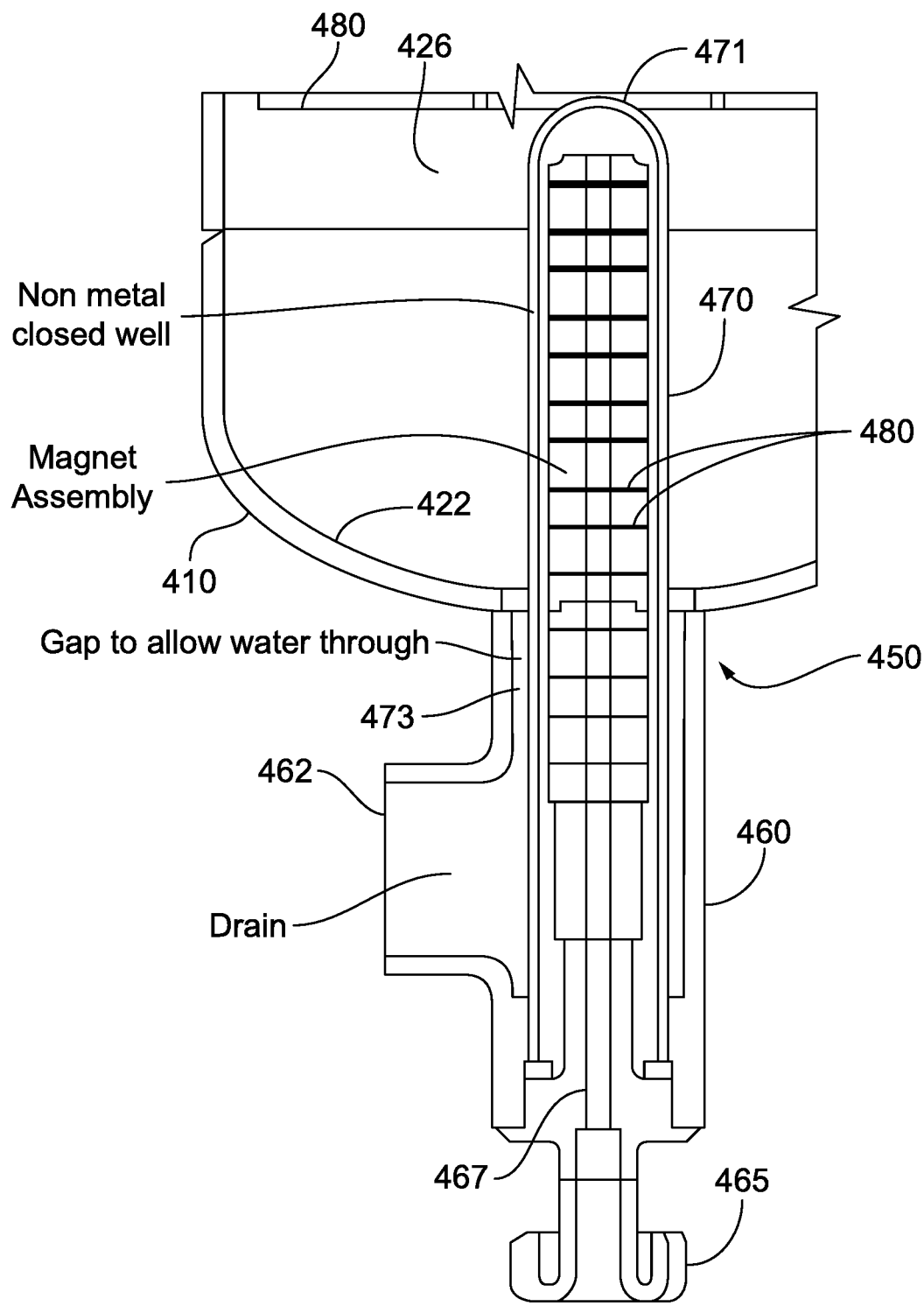
FIG. 5C provides an enlarged perspective view of the magnetic particle collector used in the separator for FIGS. 5A and 5B.

Referring now to FIGS. 5A-5C which illustrates a further separator embodiment that has been constructed in accordance with the present invention and has been designated as reference numeral 400.

Like separators 100/200 and 300, separator 400 includes, inter alia, a pressure vessel 410 that has an inlet port 414 and an outlet port 416 and a vessel wall 422. Inlet and outlet ports 414/416 each include flanged ends 418/420 respectively which allow separator 400 to be connected in-line with a fluid circulation system. Inlet piping 415 extends between inlet port 414 and flanged end 418 and outlet piping 417 extends between outlet port 416 and flanged end 420.

The wall 422 of pressure vessel 410 defines an interior chamber 426 (see FIG. 5B). Separator 400 also includes a plurality of concentrically arranged mesh screens and a cylindrical tube which are not shown in these figures for clarity purposes.

As best shown in FIG. 5C, separator 400 further includes a magnetic particle collector 450. Collector 450 includes, among other components, a fitting 460, an end cap 465, a well 470, a mounting rod or stem 467 and a magnet assembly 480. Collector 450 is secured to the bottom of the vessel 410 using fitting 460 and extends into the interior chamber 426 of the vessel 410.

Fitting 460 is secured to the bottom of vessel 410 using known techniques and includes at least one drain port 462 which allows the debris or particles collected to be removed from the system. Elongated well 470 extends through the fitting 460 into the interior chamber 426 of the vessel 410. The well 470 has a closed end 471 and can be made from a variety of non-magnetic or weakly magnetic materials, such as copper. Preferably, the well 470 extends up to the bottom of the mesh screen elements and cylindrical tube which is identified by reference numeral 480 (see also FIG. 6).

The end cap 465 secures the stem 467 and magnet assembly 480 within the internal cavity formed in the well 470. The end cap 465 can be secured to the fitting 460 using a variety of known techniques, but is preferably removably secured using for example, threads. The magnet assembly 480 can include a single magnet or a plurality of magnets which can be arranged in a stack. Using a plurality of magnets allows the height the magnet stack and well 480 to be adjusted based on the particular installation.

For example, if the magnetic particle collector 450 is retrofitted to an existing system that has a limited amount of clearance below the vessel for installation/removal of the particle collector, the number of magnets used in the collector and the length of the well can be reduced to accommodate the limited space.

When particle removal from the fluid is assisted with a rare-earth magnet, any unwanted magnetic material in the closed loop system can be separated out allowing close to 100% efficiency in ferrous impurity removal. The magnet assembly located internally within the separator captures all magnetic material and allows quick and easy removal when cleaning the system during operation. It is especially important in closed loop system to keep small particles from getting pulled through the system's pump.

As discussed above, the magnetic particle collector 450 extends the length from the purge (bottom port) to the bottom of the mesh screen elements and cylindrical tube. This is considered to be the optimal placement in order to allow water to continue in an interrupted flow stream while allowing the denser material to fall and attract to the magnet for removal.

As shown in FIG. 5C, there is gap 473 between the outer diameter of well 470 and the inner diameter of fitting 460. This gap 473 allows any debris which has collected on the exterior surface of well 470 to be flushed from the system. In order to flush the system, the magnet assembly 480 is first withdrawn from within the well 470 allowing the particles which have collected on the well to fall to the bottom of the vessel 410 and pass through the gap 473 and through the drain 462.

Advantages of the presently disclosed magnetic particle collector design include:
1. Modular design that allows for easy installation into new or existing vessels.
2. Draws particles to lowest part of tank
3. Minimizes the potential for particles to escape from the vessel.
4. The magnets do not come in direct contact with the fluid or particles.
5. The copper well will shield the magnets from the water and particles while allowing magnetic attraction.
6. The magnets can be made into sections to allow magnet assembly to be removed from vessel with minimum clearance.

Figure 6:
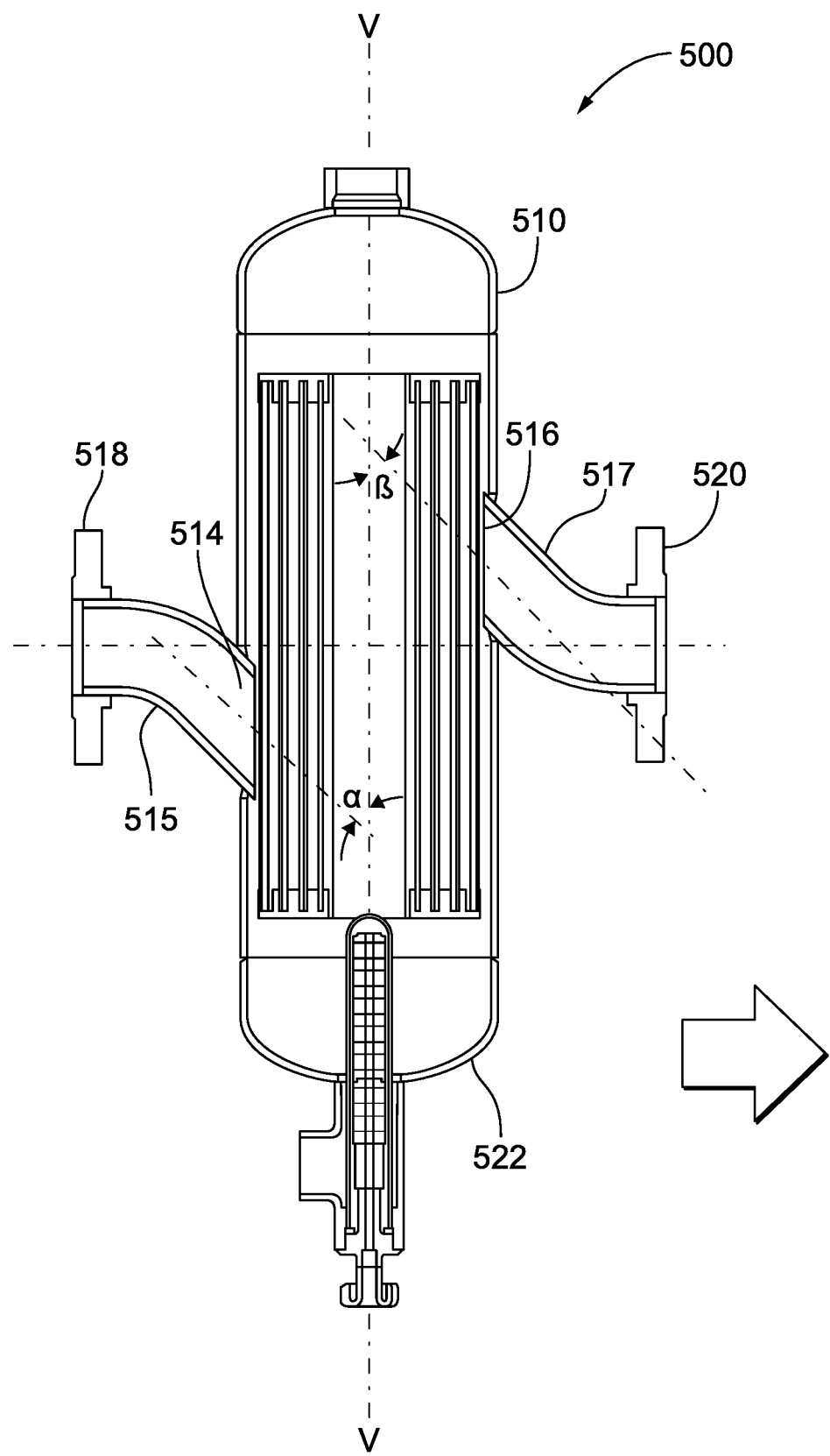
FIG. 6 is a perspective view of a further separator embodiment of the present disclosure wherein the inlet piping and outlet piping and oriented at an angle with respect to the vertical axis of the vessel.

Referring now to FIG. 6, which illustrates a further separator embodiment that has been constructed in accordance with the present invention and has been designated as reference numeral 500.

Like separators 100/200/300 and 400, separator 500 includes, inter alia, a pressure vessel 510 that has an inlet port 514 and an outlet port 516 and a vessel wall 522. Inlet and outlet ports 514/516 each include flanged ends 518/520 respectively which allow separator 500 to be connected in-line with a fluid circulation system. Inlet piping 515 extends between inlet port 514 and flanged end 518 and outlet piping 517 extends between outlet port 516 and flanged end 520.

The wall 522 of pressure vessel 510 defines an interior chamber 526. Separator 500 also includes a plurality of concentrically arranged mesh screens, a cylindrical tube and a magnetic particle collector 550.

However, unlike the previously disclosed embodiments, inlet piping 515 is arranged at an angle α that is less than 90 degrees from the vertical axis V-V of the pressure vessel such that fluid is directed into the interior chamber of the pressure vessel at a downward angle.

Additionally, the outlet piping 517 is arranged at an angle β which is less than 90 degrees from the vertical axis V-V of the pressure vessel 510.

The advantages of these angled connections include:
a. Reduced flow velocity into the vessel which promotes air and particle removal;
b. The fluid flow is forced to travel a longer path through the mesh which increases air and particle removal; and
c. The fluid flow is directed toward the magnetic particle collector which improves collection efficiency.

It is believed that the present disclosure includes many other embodiments that may not be herein described in detail, but would nonetheless be appreciated by those skilled in the art from the disclosures made. Accordingly, this disclosure should not be read as being limited only to the foregoing examples or only to the designated embodiments.

What is claimed is:
1. An apparatus for removing air and particles such as dirt from a fluid comprising:
an elongated pressure vessel having a vessel wall that defines an interior chamber and a vertical axis for the apparatus, wherein inlet and outlet ports are formed in the vessel wall, the inlet port allowing fluid to enter the interior chamber and the outlet port allowing conditioned fluid to exit the interior chamber of the elongated pressure vessel;
a plurality of concentrically arranged cylindrical mesh screen elements positioned within the interior chamber which release entrained air from the fluid entering the interior chamber;
a cylindrical tube having a diameter that is smaller than a diameter of an inner most one of the plurality of concentrically arranged cylindrical mesh screen elements such that the cylindrical tube is positioned within the concentrically arranged mesh screen elements for removing particles from the fluid entering the interior chamber; and a magnetic particle collector secured to the bottom port of the elongated pressure vessel and extending into the interior chamber of the elongated pressure vessel, wherein the magnetic particle collector includes a drain port and an elongated tubular well that defines an elongated cavity.

2. The apparatus as recited in claim 1, wherein the elongated pressure vessel further comprises top and bottom ports, an air vent associated with the top port of the elongated pressure vessel that allows air to be vented from the elongated pressure vessel and a debris trap associated with the bottom port of the elongated pressure vessel for allowing collected particles to be purged from the elongated pressure vessel.

3. The apparatus as recited in claim 1, wherein each of the plurality of concentrically arranged mesh screen elements is made from separate piece of screen material which is welded along a seam to form a cylinder.

4. The apparatus as recited in claim 1, wherein the plurality of concentrically arranged mesh screen elements includes five cylindrical screen elements having differing diameters and being spaced from one another and from the cylindrical tube.

5. The apparatus as recited in claim 1, wherein the inlet and outlet ports each have an inner diameter which is smaller than or equal to an outer diameter of the cylindrical tube.

6. The apparatus as recited in claim 1, further comprising spacer arms that maintain a radial spacing between each of the concentrically arranged mesh screen elements, wherein each of the concentrically arranged mesh screen elements are spaced from one another.

7. The apparatus as recited in claim 1, wherein the inlet and outlet ports are aligned along an axis which intersects with the vertical axis for the elongated pressure vessel.

8. The apparatus as recited in claim 1, wherein the inlet and outlet ports are vertically offset.

9. The apparatus as recited in claim 1, further including inlet piping which extends from and is operatively connected to the inlet port, wherein the inlet piping is arranged at an angle less than 90 degrees from the vertical axis of the elongated pressure vessel such that fluid is directed into the interior chamber of the elongated pressure vessel at a downward angle.

10. The apparatus as recited in claim 1, further including outlet piping which extends from and is operatively connected to the outlet port, wherein the outlet piping is arrange at an angle which is less than 90 degrees from the vertical axis of the elongated pressure vessel.

11. The apparatus as recited in claim 1, wherein a screen material used for the plurality of concentrically arranged mesh screen elements is non-woven and made from vertical wire welded over horizontal wire with specific gaps to allow air bubbles to attach to the vertical wire and travel vertically unimpeded.

12. The apparatus as recited in claim 1, further including a series of magnets arranged in a vertical orientation and removably inserted into the elongated cavity of the elongated tubular well, the series of magnets being isolated from fluid particles by the elongated cavity.

13. A separator device, comprising:
a pressure vessel which includes inlet and outlet ports and has a vessel wall which defines an interior chamber, the inlet port allowing fluid to enter the interior chamber and the outlet port allowing conditioned fluid to exit the interior chamber;
at least one cylindrical mesh screen positioned within the interior chamber for releasing entrained air from the fluid entering the interior chamber;
a solid cylindrical tube having a diameter that is smaller than a diameter of the at least one cylindrical mesh screen such that the sold cylindrical tube is positioned within an interior through passage of the at least one cylindrical mesh screen for removing particles from the fluid entering the interior chamber, wherein the solid cylindrical tube is spaced from an interior surface of the at least one cylindrical mesh screen; and
a magnetic particle collector extending into the interior chamber of the pressure vessel, wherein the magnetic particle collector includes a drain port and an elongated tubular well that defines an elongated cavity.

14. The apparatus as recited in claim 13, wherein the pressure vessel further comprises top and bottom ports, an air vent associated with the top port of the pressure vessel that allows air to be vented from the pressure vessel and a debris trap associated with the bottom port of the pressure vessel for allowing collected particles to be purged from the pressure vessel.

15. The apparatus as recited in claim 13, wherein the at least one cylindrical mesh screen is made from screen material which is welded along a seam to form a cylinder.

16. The apparatus as recited in claim 13, wherein apparatus includes a plurality of cylindrical mesh screen elements having differing diameters that are greater than the diameter of the solid cylindrical tube, the plurality of cylindrical mesh screen elements being concentrically arranged and spaced from one another and the solid cylindrical tube.

17. The apparatus as recited in claim 13, wherein the inlet and outlet ports each have an inner diameter which is smaller than or equal to an outer diameter of the solid cylindrical tube.

18. The apparatus as recited in claim 13, further comprising spacer arms that maintain a radial spacing between each of a plurality of the cylindrical mesh screens, wherein each cylindrical mesh screen of the plurality of cylindrical mesh screens are concentrically arranged and spaced from one another.

19. The apparatus as recited in claim 13, wherein the inlet and outlet ports are aligned along an axis which intersects with the vertical axis for the pressure vessel.

20. The apparatus as recited in claim 13, wherein the inlet and outlet ports are vertically offset.

21. The apparatus as recited in claim 13, further including inlet piping which extends from and is operatively connected to the inlet port, wherein the inlet piping is arranged at an angle less than 90 degrees from the vertical axis of the pressure vessel such that fluid is directed into the interior chamber of the pressure vessel at a downward angle.

22. The apparatus as recited in claim 13, further including outlet piping which extends from and is operatively connected to the outlet port, wherein the outlet piping is arrange at an angle which is less than 90 degrees from the vertical axis of the pressure vessel.

23. The apparatus as recited in claim 13, wherein a screen material used for the at least one cylindrical mesh screen is non-woven and made from vertical wire welded over horizontal wire with specific gaps to allow air bubbles to attach to the vertical wire and travel vertically unimpeded.

24. The apparatus as recited in claim 13, further including a series of magnets removably inserted into the elongated cavity of the elongated tubular well.

25. A separator device, comprising:
a pressure vessel which includes inlet and outlet ports and has a vessel wall which defines an interior chamber, the inlet port allowing fluid to enter the interior chamber and the outlet port allowing conditioned fluid to exit the interior chamber;
at least one cylindrical mesh screen positioned within the interior chamber for releasing entrained air from the fluid entering the interior chamber;
a magnetic particle collector extending into the interior chamber of the pressure vessel, wherein the magnetic particle collector includes a drain port and an elongated tubular well that defines an elongated cavity; and
a solid cylindrical tube having a diameter that is smaller than a diameter of the at least one cylindrical mesh screen and being positioned within and spaced from the at least one cylindrical mesh screen for removing particles from the fluid entering the interior chamber.

\* \* \* \* \*